US010065476B2

(12) United States Patent
Bonneau et al.

(10) Patent No.: US 10,065,476 B2
(45) Date of Patent: Sep. 4, 2018

(54) DEVICE FOR CONTROLLING A VEHICLE LIGHTING AND/OR SIGNALLING SYSTEM

(71) Applicant: Valeo Vision, Bobigny (FR)

(72) Inventors: Fabien Bonneau, Angers (FR); Erwan Faoucher, Arville (FR); Michel Hermitte, Angers (FR)

(73) Assignee: Valeo Vision, Bobigny (FR)

( * ) Notice: Subject to any disclaimer, the term of this patent is extended or adjusted under 35 U.S.C. 154(b) by 128 days.

(21) Appl. No.: 15/130,143

(22) Filed: Apr. 15, 2016

(65) Prior Publication Data

US 2016/0303944 A1  Oct. 20, 2016

(30) Foreign Application Priority Data

Apr. 16, 2015 (FR) ...................... 15 53375

(51) Int. Cl.
| | | |
|---|---|---|
| *B60H 1/00* | (2006.01) | |
| *B60Q 1/04* | (2006.01) | |
| *F21S 45/60* | (2018.01) | |
| *F21V 29/90* | (2015.01) | |

(52) U.S. Cl.
CPC .......... *B60H 1/00785* (2013.01); *B60Q 1/04* (2013.01); *F21S 45/60* (2018.01); *F21V 29/90* (2015.01)

(58) Field of Classification Search
CPC .............................. B60H 1/00785; B60Q 1/04
See application file for complete search history.

(56) References Cited

U.S. PATENT DOCUMENTS

| | | | | |
|---|---|---|---|---|
| 4,686,656 A | * | 8/1987 | Morishima | B60Q 1/0035 296/78.1 |
| 5,701,752 A | * | 12/1997 | Tsunokawa | B60H 1/00785 165/204 |
| 8,563,898 B1 | | 10/2013 | Wright et al. | |
| 2004/0050076 A1 | * | 3/2004 | Palfy | A42B 3/24 62/155 |
| 2006/0000597 A1 | * | 1/2006 | Errington | B60H 1/00785 165/204 |
| 2007/0130972 A1 | * | 6/2007 | Jang | B60H 1/00785 62/186 |
| 2008/0066477 A1 | * | 3/2008 | Aoki | B60H 1/00785 62/150 |
| 2010/0163220 A1 | * | 7/2010 | Nakajima | B60H 1/00785 165/202 |
| 2012/0034857 A1 | * | 2/2012 | Blake, III | B60H 1/00785 454/75 |
| 2013/0212765 A1 | * | 8/2013 | Cornelius | A42B 3/245 2/15 |
| 2014/0009619 A1 | * | 1/2014 | Koppe | H04N 5/2252 348/148 |

FOREIGN PATENT DOCUMENTS

| | | |
|---|---|---|
| DE | 102005019651 A1 | 11/2006 |
| DE | 102012010871 A1 | 1/2013 |
| FR | 3009371 A1 | 2/2015 |

* cited by examiner

*Primary Examiner* — Yonel Beaulieu
*Assistant Examiner* — Martin A Weeks
(74) *Attorney, Agent, or Firm* — Oblon, McClelland, Maier & Neustadt, L.L.P.

(57) ABSTRACT

A device for controlling a lighting and/or signaling system of a vehicle that includes a controller adapted to determine a dew point temperature value inside the system from at least one value of the temperature inside the system and at least one value of the relative humidity inside the system.

21 Claims, 3 Drawing Sheets

DEVICE FOR CONTROLLING A VEHICLE LIGHTING AND/OR SIGNALLING SYSTEM

CROSS-REFERENCE TO RELATED APPLICATIONS

This application claims priority to the French application 1553375 filed Apr. 16, 2015, which applications are incorporated herein by reference and made a part hereof.

BACKGROUND OF THE INVENTION

1. Field of the Invention

The invention concerns vehicle lighting and/or signalling systems.

Vehicle lights and headlights include an outer lens that separates the system from the outside of the vehicle. These systems include an internal space which, like any non-empty space, contains a mass of air, in particular of water vapor. Now, when water vapor cools, it can condense and be transformed into liquid water or ice. This notably occurs if the mass of air situated inside the light or headlight is cooled by the temperature outside the vehicle, notably at the level of the outer lens. This condensation generates mist on the interior of the outer lens of the light or headlight. In the event of an even lower temperature, the water vapor can solidify and be transformed into frost. Mist can also form on the outside of the outer lens. The mist can also be transformed into frost, for example at night. Now, the appearance of mist or frost on the outer lenses of the lights or headlights is hazardous because their brightness is diminished, the vehicle therefore becoming less visible from the outside or the lighting provided becoming insufficient.

2. Description of the Related Art

There is known from the document DE-102012010871 a headlight including an internal temperature sensor, a visual sensor and heating means. The heating means are activated automatically to de-ice the outer lens of the headlight if the visual sensor detects frost or if a predetermined temperature threshold has been crossed.

However, this device manages only de-icing, i.e. combats only solid condensation, and not liquid condensation. Moreover, it represents a cure. In fact, the visual sensor detects the frost once it is present, which does not make it possible to prevent its appearance. Although the visual sensor is not able to detect liquid condensation, it might be thought that the temperature sensor of the above device would make it possible to prevent it. However, the use of a temperature threshold is ineffective for detecting mist because liquid condensation can appear at different temperatures as a function of environmental conditions. Accordingly, by using a predetermined temperature threshold, the reaction of the device would be ineffective and, depending on the circumstances, activate heating too soon or too late relative to misting up.

SUMMARY OF THE INVENTION

An object of the invention is to improve the protection of the system against mist or frost liable to appear on the inside or outside wall of the outer lens of the headlight.

To this end, the invention provides a device for controlling a lighting and/or signalling system of a vehicle, which includes means adapted to determine a dew point temperature value inside the system from at least one value of the temperature inside the system and at least one value of the relative humidity inside the system.

Thus the means are adapted to determine a value of the temperature inside the system and a relative humidity inside the system and to deduce therefrom the value of the dew point temperature, i.e. the temperature at which the water vapor in the mass of air inside the system will liquefy when it is cooled at the level of the outer lens, thus forming mist on the inside of the outer lens. This information makes it possible to improve the control of the system to prevent or combat misting up and icing up.

The means advantageously include a sensor of the temperature inside the system.

The inside temperature is therefore not determined indirectly but measured directly.

The means preferably include a sensor adapted to measure a value of the relative humidity inside the system.

Accordingly, the inside relative humidity is not determined indirectly but measured directly.

The means preferably include a sensor of the temperature outside the system.

This sensor may optionally be independent of another sensor of the vehicle.

The device preferably includes at least one heating means. The at least one heating means are adapted to heat the air inside the device and/or to heat directly at least one wall of the device.

The means advantageously include control means adapted to control at least one heating means of the system as a function of the value of the dew point temperature and at least one other temperature value.

The other value is preferably a value of the temperature outside the vehicle.

In fact, the value of the outside temperature has a direct effect on the value of the temperature of the outer lens of the system, since the latter is in direct contact with the outside of the vehicle. Accordingly, if the outer lens is not heated, its temperature may be equal to the temperature outside the vehicle. Now, if the temperature of the outer lens at the level of its wall on the system side is lower than the dew point temperature of the mass of air inside the system, droplets may form by condensation on the inside of the outer lens. The value of the outside temperature is therefore monitored, for example by means of a sensor already present on many vehicles, relative to the value of the dew point temperature of the mass of air inside the system, so as to modulate by heating the value of the temperature inside the system to prevent the inside of the outer lens misting up.

The means are advantageously adapted to maintain at least one heating means of the system active for a predetermined time once the value of the outside temperature has risen above the value of the dew point temperature.

Energy savings are therefore achieved because activating and deactivating the at least one heating means each time that the temperature curves cross is avoided.

The means are preferably adapted to determine at a given time a value of the derivative of a function representing a future evolution of the dew point temperature value at the given time.

By value of the derivative of a function at a given time is meant, for example, the director coefficient of the tangent to a curve representing the function at the given time. The director coefficient is also referred to as the slope.

In particular the means are also adapted to calculate the equation of the tangent to the curve representing the future evolution of the dew point temperature value at the given time.

The means therefore store the dew point temperature values as and when they are determined. This makes it possible to establish a series of values and therefore to estimate at a given time a trend of the evolution of the dew point temperature values. The means can then anticipate the future evolution of the dew point temperature and optionally command the at least one heating means to heat the mass of air inside the system and/or the outer lens of the headlight as a function of these forecasts.

The means are advantageously adapted to determine at a given time a value of the derivative of a function representing a future evolution of the outside temperature value at the given time.

By value of the derivative of a function at a given time is meant, for example, the director coefficient of the tangent to a curve representing the function at the given time. The director coefficient is also referred to as the slope.

The means therefore store the measured values of the outside temperature as and when they are measured. This makes it possible to establish a series of values and therefore to estimate at a given time a trend of the evolution of the outside temperature values.

The means are advantageously adapted to determine a value representing a time at which the dew point temperature value will be equal to the value of the outside temperature and to command the at least one heating means with a time advance of a predetermined duration relative to that time.

More specifically, the means are adapted to determine the time at which the tangent to the dew point temperature curve and the tangent to the outside temperature curve cross. In other words, the means are adapted to determine the point of intersection of the tangents.

The means can therefore determine if there is a risk in the near future of the value of the dew point temperature rising above the value of the outside temperature. In this case, there would be a risk of the value of the temperature of the outer lens being lower than the dew point. The at least one heating means can then be activated in order to prevent this situation arising. This enables savings to be achieved. In fact, it is preferable to activate the at least one heating means in a preventive manner, for example using a low heating power, rather than to have to combat condensation already present using a high heating power.

The dew point temperature value preferably represents the current dew point temperature.

The means are advantageously adapted to control the at least one heating means if the dew point temperature value is higher than the outside temperature value.

The at least one heating means are therefore activated if a potential condensation situation already exists when the value of the dew point temperature is higher than the value of the outside temperature.

The means are preferably further adapted to control the at least one heating means so as to prevent icing inside the system.

The means are advantageously adapted to determine a power value of the at least one heating means from at least two non-zero values as a function of a value of the temperature outside the vehicle.

For example the heating power value is inversely correlated to the value of the outside temperature. Thus, in a predetermined range of temperatures, the lower the temperature, the higher the heating power.

The invention also provides a lighting and/or signalling system that includes at least one device in accordance with the invention.

The invention finally provides a method of controlling a vehicle lighting and/or signalling system in which the value of the dew point temperature inside the system is determined from at least one value of the temperature inside the system and at least one value of the relative humidity inside the system.

The at least one heating means are advantageously controlled as function of the dew point temperature value and another temperature value, notably a value of the temperature outside the vehicle.

The at least one heating means of the system are preferably maintained active for a predetermined time once the value of the outside temperature has risen above the dew point temperature value.

There is advantageously determined at a given time a value of the derivative of a function representing the evolution of the dew point temperature value at the given time.

There is preferably determined a value representing a time at which the dew point temperature value will be equal to the outside temperature value and the at least one heating means are controlled with a time advance of predetermined duration relative to that time.

The dew point temperature value advantageously represents the current dew point temperature.

The at least one heating means are preferably commanded if the dew point temperature value is greater than the outside temperature value.

The at least one heating means of the system are advantageously controlled so as to prevent icing inside the system.

A power value of the at least one heating means between at least two non-zero values is preferably commanded as a function of a value of the temperature outside the vehicle.

These and other objects and advantages of the invention will be apparent from the following description, the accompanying drawings and the appended claims.

BRIEF DESCRIPTION OF THE ACCOMPANYING DRAWINGS

One embodiment of the invention will now be described with reference to the appended figures, which are provided by way of nonlimiting example, in which figures.

DETAILED DESCRIPTION OF THE PREFERRED EMBODIMENTS

Figure 1:
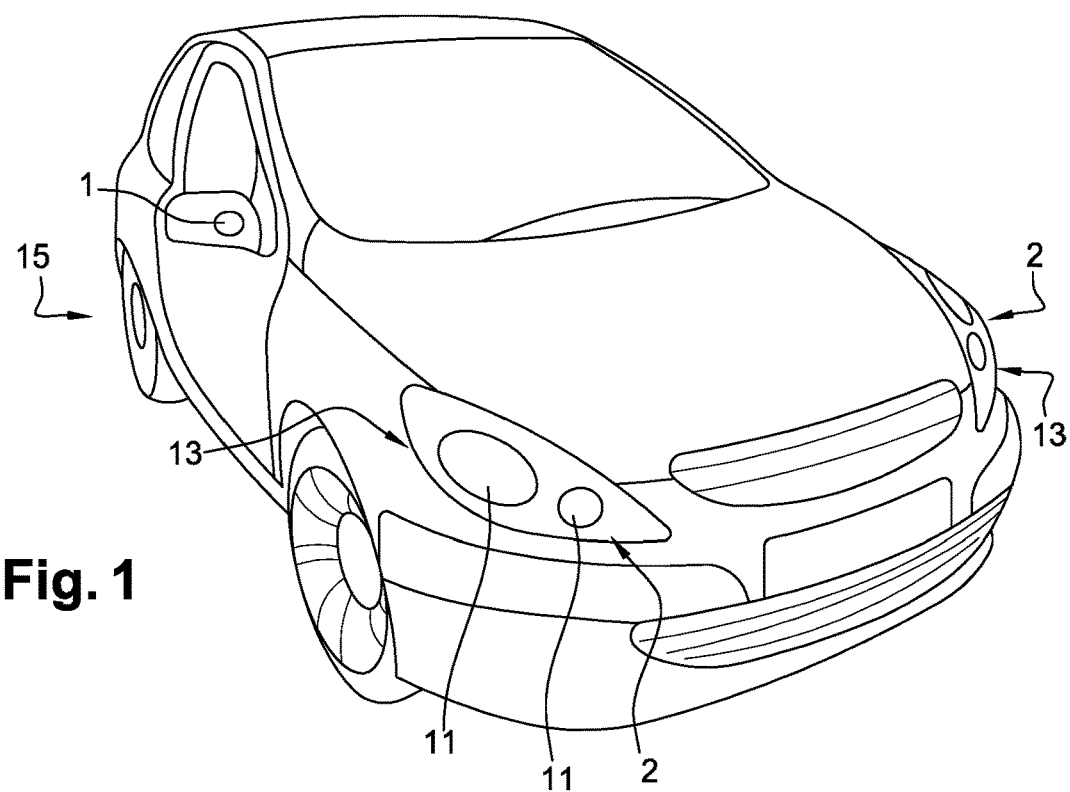
FIG. 1 shows a vehicle including a device in accordance with the invention.

FIG. 1 shows a vehicle 15. This vehicle 15 includes two lighting and signalling systems 2. It also includes a device in accordance with the invention. Each lighting and signalling system 2 includes light sources 11 situated behind an outer lens 13.

Figure 2:
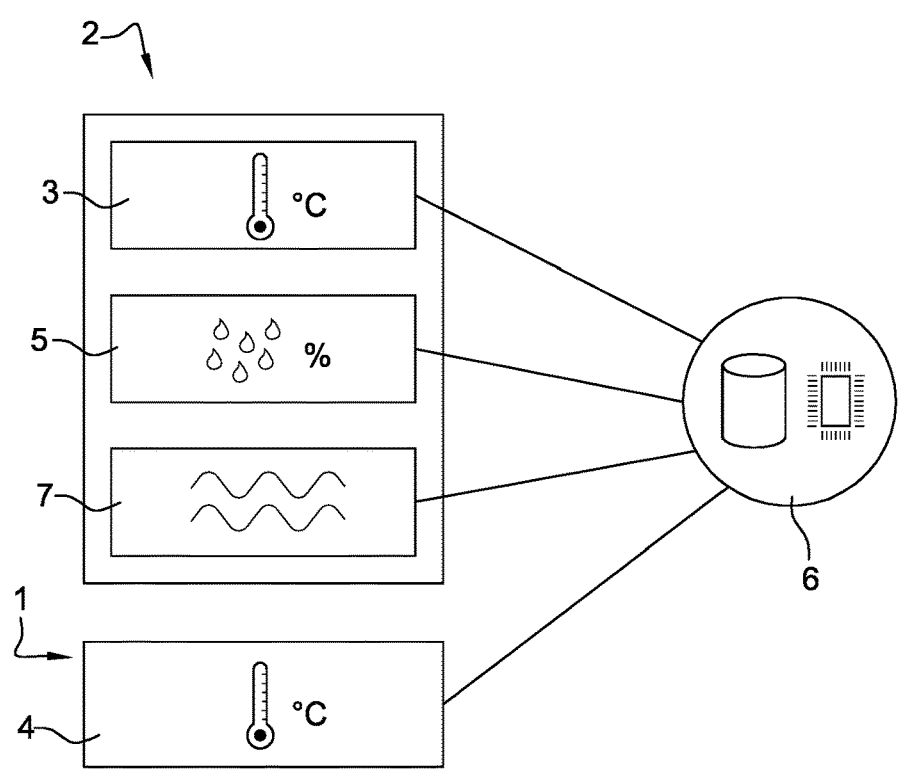
FIG. 2 is a diagram of a device in accordance with the invention.

As shown diagrammatically in FIG. 2, the device in accordance with the invention comprises three parts. Firstly a part situated inside the lighting and signalling system 2 which includes a temperature sensor 3 which measures in real time the temperature of the mass of air inside the lighting and signalling system 2 between the light sources 11 and the outer lens 13 of the lighting and signalling system 2, a relative humidity sensor 5 which measures the relative humidity inside the same space, and heating means 7 which are adapted to heat this mass of air, and the more precise purpose of which is to heat the interior wall of the outer lens 13. The heating means 7 may function in various manners: they can heat the mass of air and/or the interior wall of the outer lens 13 by blowing warm air and/or by emitting heat by the Joule effect, for example by means of a strip of metal at the bottom of the outer lens 13 of the lighting and signalling system 2. Any other means of heating the interior mass of air, a fortiori the interior wall of the outer lens 13 of the lighting and signalling system 2, may be envisaged.

The second part of the device includes a temperature sensor 1 for sensing the outside temperature. Here this is situated on the wing mirror of the vehicle 15, as shown in FIG. 1, but could be anywhere provided that the temperature that it measures accurately corresponds to the temperature outside the vehicle 15, for example, without interference from heat sources specific to the vehicle 15. This temperature sensor 1 can be part of the CAN (Controller Area Network) of the vehicle 15 or not.

Finally, the third part of the device includes automatic calculation and control means 6 such as a processor associated with a database. These automatic calculation and control means 6 are connected to the sensors 3, 4, 5 and to the aforementioned heating means 7. They therefore know in real time the values of the outside temperature, the temperature inside the lighting and signalling system 2 and the relative humidity inside the lighting and signalling system 2. The latter two values enable the automatic calculation and control means 6 to determine the value of the dew point temperature of the mass of air inside the lighting and signalling system 2. This temperature, also called the "dew point", is a thermodynamic parameter characterizing the moisture content of a gas. The dew point of a given mass of air is the temperature at which the partial pressure of the water vapor in that mass of air is equal to its saturated vapor pressure. It is therefore the temperature to which the mass of air must be cooled at constant pressure and relative humidity for it to become saturated. In other words, this is the temperature to which a mass of air must be cooled at constant pressure in order to for the water vapor in the mass of air to condense, being transformed into liquid. The automatic calculation and control means 6 can therefore determine at what temperature inside the lighting and signalling system 2 droplets will form, notably on the outer lens 13 of the lighting and signalling system 2, if the latter is cooled. The automatic calculation and control means 6 therefore determine from this what temperature value must not be reached inside the lighting and signalling system 2 in order for mist not to form on the interior wall of the outer lens 13, which is necessarily the coldest part of the lighting and signalling system 2 and therefore the first affected. The formula defining the dew point temperature is:

$$Td(t, RH) = Tn * \left(\ln\left(\frac{RH}{100\%}\right) + m * \frac{t}{Tn+t}\right) / \left(m - \left[\ln\left(\frac{RH}{100\%}\right) + m * \frac{t}{Tn+t}\right]\right),$$

in which:
Td is the dew point temperature in degrees Celsius;

t is the temperature in degrees Celsius of the mass of air inside the lighting and signalling system 2;

RH is the relative humidity expressed as a percentage of this mass of air;

m is a dimensionless constant and has the value 17.62; and

Tn is another constant and has the value 234.12 degrees Celsius.

The automatic calculation and control means 6 therefore use this formula to determine in real time the value of the dew point temperature of the mass of air inside the lighting and signalling system 2.

The automatic calculation and control means 6 can moreover anticipate the future evolution of the "dew point". In fact, they calculate the dew point temperatures as and when they obtain the values of the temperature inside the lighting and signalling system 2 and the relative humidity values. They therefore determine a time series of dew point temperatures. From this series of values it is possible to estimate a trend of the future evolution of the dew point and to estimate the values that the dew point will assume in the following minutes. For example, on a curve showing the evolution of the dew point temperature, it suffices to extrapolate the direction taken by the curve for the latest calculated values to obtain an idea of the future evolutions of the dew point temperature.

Finally, the automatic calculation and control means 6 are adapted to control the heating means 7. They can therefore activate them, deactivate them and modulate their power between at least two non-zero power values.

Figure 3:
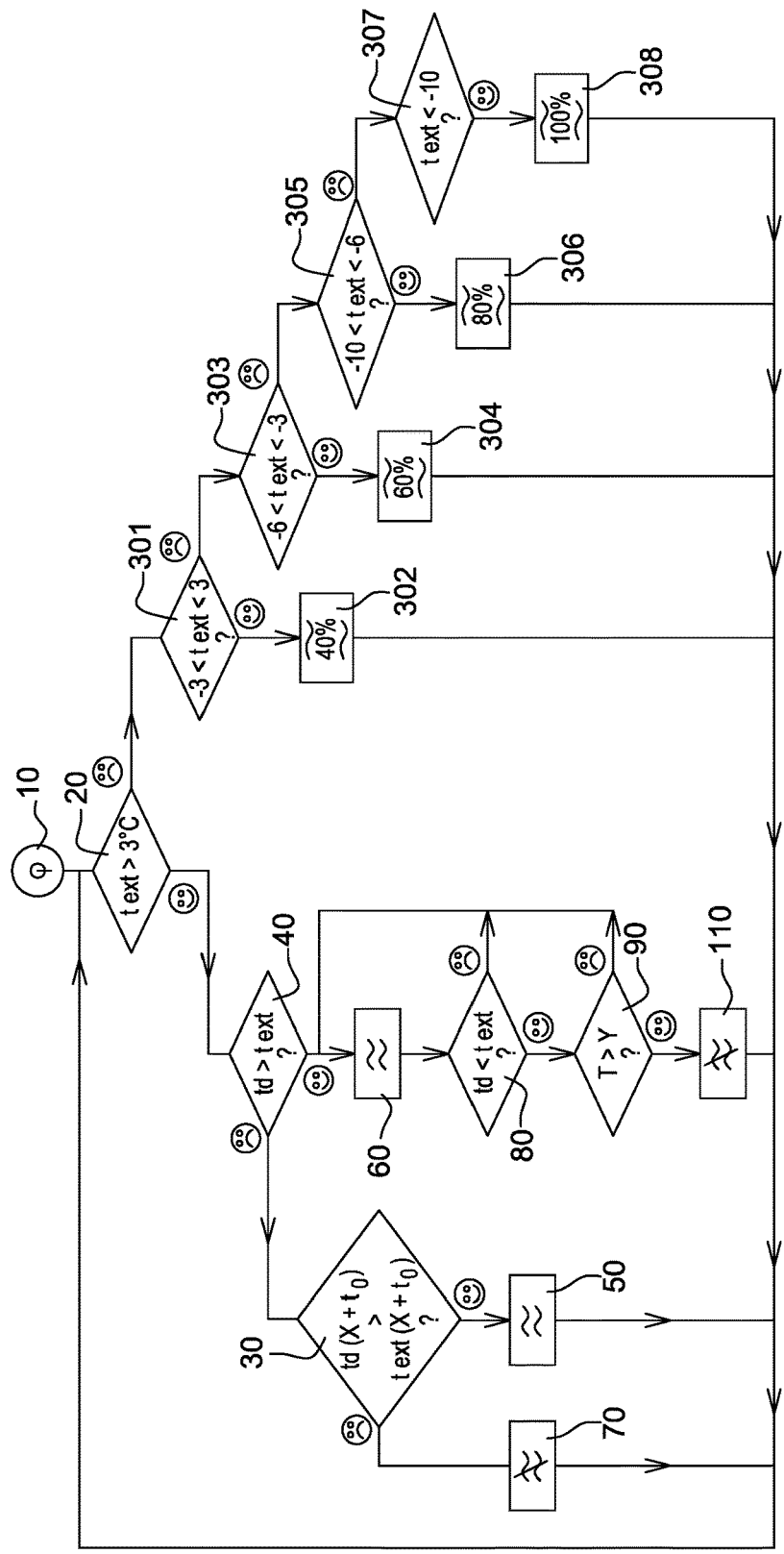
FIG. 3 shows a method in accordance with the invention.

A method in accordance with one embodiment of the invention implemented by means of a device in accordance with the invention will now be described with reference to FIG. 3, the method complying with four control laws described later. Three of these laws are aimed at preventing liquid condensation inside the lighting and signalling system 2 or stopping liquid condensation by evaporating droplets already formed. The fourth law serves to prevent the lighting and signalling system 2 from icing up. Hereinafter and as above the term "outside temperature" will always refer to the temperature outside the vehicle 15 and the term "dew point temperature" or "dew point" will always refer to the dew point temperature of the mass of air inside the lighting and signalling system 2 of the vehicle 15.

In a first step 10 (FIG. 3), the device in accordance with the invention described above is activated. It may be activated manually by a user of the vehicle 15 or automatically, for example on starting the vehicle 15.

The step 20 is a test concerning only the value of the temperature outside the vehicle 15, measured by the temperature sensor 1, for example. If the value of that temperature is greater than or equal to 3 degrees Celsius, the device employs the three control laws aimed at preventing liquid condensation, i.e. misting up. If not, the device activates the control law aimed at preventing solid condensation, i.e. icing up.

In the first case, the three laws to be complied with are:
A So-Called "Preventive" Decondensation Law:
If in a test step 40 the automatic calculation and control means 6 determine that the outside temperature is higher than the dew point temperature Td, then the test step 30 follows. If during this test step 30 the automatic calculation and control means 6 determine that the value of the outside temperature will be less than or equal to the value of the dew point temperature within X minutes starting from the current time t0, X having the value of 10 minutes, for example, the automatic calculation and control means 6 command the activation of the heating means 7 in the step 50. This action being preventive, the automatic calculation and control means 6 may command a low heating power so as to maintain the current temperature, for example. Thus condensation is prevented from occurring instead of combating it once it is present. In this way, mist is never formed on the outer lenses 13 of the lighting and signalling systems 2 of the vehicle 15, with the result that the vehicle 15 is always clearly visible, the lighting is always sufficient, and a large amount of energy is not expended. The invention therefore exploits the anticipation capabilities of the automatic calculation and control means 6, which do not wait for condensation to occur before acting. Where the value of the outside temperature is concerned, its future evolution is estimated in the same way as that of the dew point temperature, i.e. as a function of its preceding values and its trend. The outside temperature could however also be anticipated by means of meteorological forecasting tools.

A So-Called "Active" Decondensation Law:

If the dew point temperature of the lighting and signalling system 2 is higher than the temperature outside the vehicle 15 at the present time, as determined during the test step 40, the automatic calculation and control means 6 command the activation of the heating means 7 in a step 60. This prevents the temperature of the interior wall of the outer lens 13 of the lighting and signalling system 2 reaching or remaining at the outside temperature, which can cause misting up. Heating is therefore applied so that the inside temperature is higher than the current dew point temperature—also referred to as the "present" dew point temperature, i.e. when calculated at the present moment, which is different from the dew point temperature estimated at a future moment, in order to prevent misting up or to cause existing misting to disappear quickly. Given the aforementioned preventive law, it can happen that the heating means 7 are already activated when this situation rises. Thus here the heating power may be increased or maintained.

A So-Called "Curative" Decondensation Law:

This law takes over from the aforementioned "active" law. The heating means 7 being activated because of the active law, if the value of the outside temperature becomes higher than the value of the current dew point temperature during a step 80, the situation is no longer that of the active law. It is nevertheless necessary for the heating means 7 to remain active for a predetermined time Y, meaning during the step 90. The time Y is 10 minutes, for example. In fact, if the value of the outside temperature is at the level of the dew point temperature, it can happen that it is just higher than the latter and then just lower than the latter a few moments later. If the automatic calculation and control means 6 were to deactivate and to reactivate the heating means 7 where these temperature curves cross or as a function of predictions of these crossings, the energy expended would be greater than that expended to maintain the heating for a time Y. The "active" and "preventive" laws on their own would therefore risk encouraging a cycle of activation and deactivation of heating each time that the curves of the evolution of the aforementioned two values cross. This is why the curative law is necessary.

Of course, the values of the times X and Y could vary as a function of choices made by the manufacture, of choices made by the user of the vehicle 15, or as a function of environmental conditions.

If the automatic calculation and control means 6 have determined by means of the temperature sensor 1 in the step 20 that the value of the outside temperature is less than 3 degrees Celsius, then the device applies a fourth law, which relates to de-icing. In fact, at very low temperatures, the risk is that the water vapor condenses not as droplets but directly as ice, forming frost, notably on the outer lenses of the lights or headlights of the vehicle 15.

This fourth, so-called "de-icing law" stipulates that the automatic calculation and control means 6 must command a heating power inversely correlated with the outside temperature. For example, between 3 and −3 degrees Celsius, the automatic calculation and control means 6 command a heating power equivalent to 40% of the maximum power, as steps 301 and 302 show. For an outside temperature between −3 and −6 degrees Celsius, the power commanded would be 60%, and then 80% for an outside temperature between −6 and −10 degrees Celsius, and finally 100% when the outside temperature is less than −10 degrees Celsius. These steps 303 to 308 are also shown in FIG. 3. Of course, the power and threshold values could be defined differently. This "de-icing" law makes it possible to combat icing up of the lights or headlights of the vehicle 15 with a proportionate expenditure of energy. The method and the device in accordance with the invention that implements it therefore make it possible also to achieve energy savings when de-icing.

The device in accordance with the invention is therefore adapted to manage an overall solution for controlling decondensation and de-icing means taking into account the conditions for occurrence of the dew point to activate at least the decondensation function as a function of the outside environment and taking the outside environment into account to trigger at least the de-icing function. The device, which is entirely automatic, therefore makes it possible to maximize the lighting range of the lights or headlights of the vehicle 15 by preventing misting up or icing up whilst optimizing energy consumption.

Figure 4:
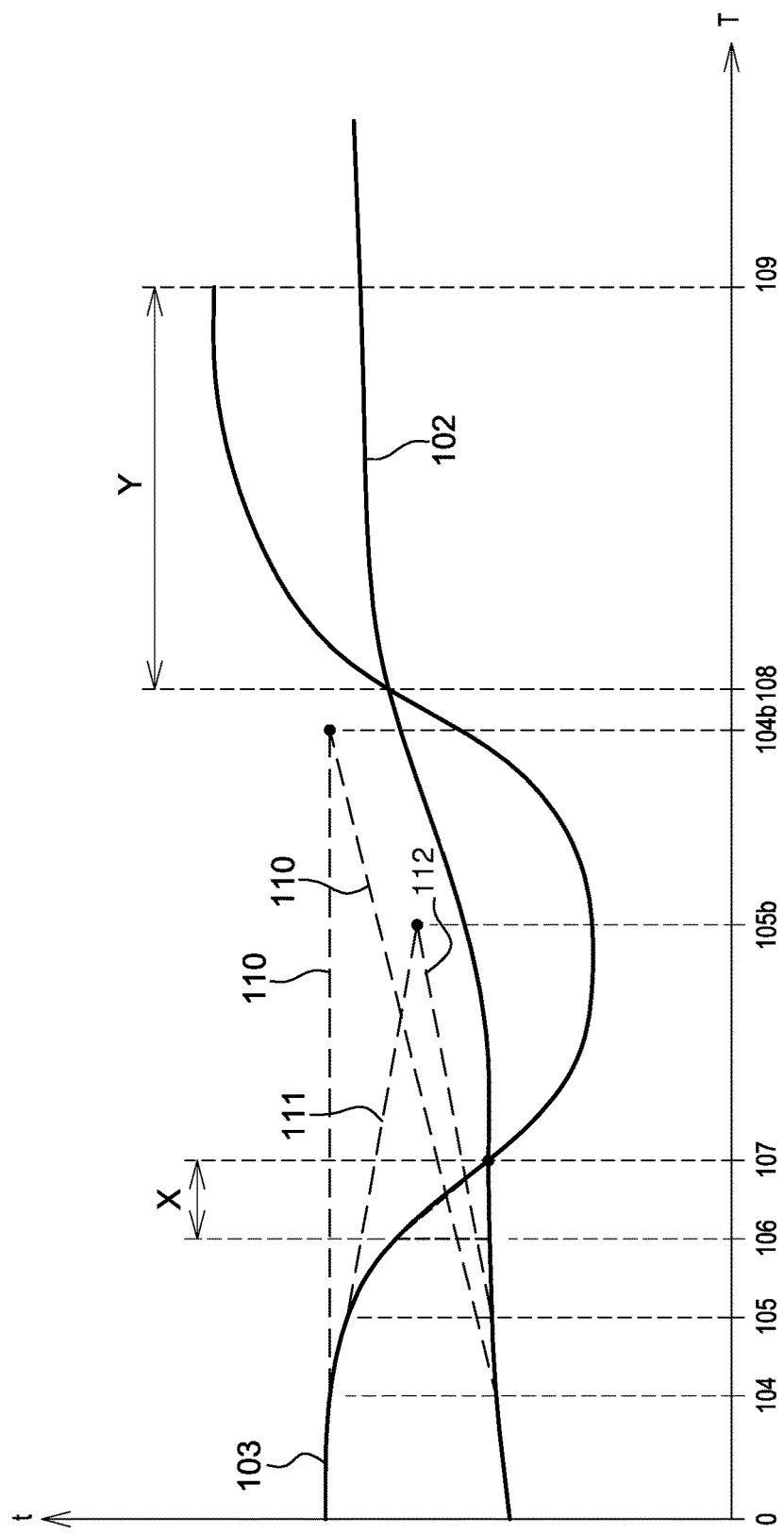
FIG. 4 is a graph illustrating temperature evolutions when using one embodiment of a method in accordance with the invention.

The evolution of the aforementioned temperatures when using the aforementioned method governed by the four laws will now be described with reference to FIG. 4.

The graph shows the evolution of the temperatures as a function of time. The curve 103 represents the evolution of the outside temperature over time. The curve 102 represents the evolution of the dew point temperature during the same time period. The device in accordance with the invention has been activated before the time zero shown on the graph. At this time 0, the outside temperature is higher than the dew point temperature. The heating means 7 are therefore not yet activated.

The times 104, 105 and 106 refer to the curative law. In fact, using the automatic calculation and control means 6 and the temperature and relative humidity sensors 1, 3 and 5, the device calculates in real time the evolution of the dew point temperature of the lighting and signalling system 2 and the outside temperature. At the time 104 the automatic calculation and control means 6 determine from the tangents (111, 112) to the curves represented by dashed line extensions 110, that the outside temperature should fall below the dew point temperature at the time 104b if the curves continue to evolve as at the time 104. The time 104b therefore corresponds to the time at which the two tangents (111, 112) to the curves (102, 103) intersect. The time between the point 104 and the point 104b being greater than X, the automatic calculation and control means 6 do not activate the heating means 7. At the time 105, the automatic calculation and control means 6 determine that crossing of the tangents (113, 114) is predicted at the point 105b. Once again, the time between the points 105 and 105b is greater than X. At the point 106, the automatic calculation and control means 6 determine that the two tangents (111, 112) will cross in X minutes, at the time 107. This is why the automatic calculation and control means 6 command the activation of the heating means 7 at the time 106, thus applying the "preventive" law. Between the time 107 and the time 108 the outside temperature is lower than the dew point temperature. The device therefore applies the "active" law and maintains or even increases the heating power of the heating means 7. From the point 108, the outside temperature is again higher than the dew point temperature. The device then applies the "curative" law: It maintains the heating, optionally at lower power, for a time Y that ends at the point 109.

The dew point temperature values may be calculated and the outside temperatures may be measured at predetermined regular time intervals, for example every second or every tenth of a second.

The invention is not limited to the embodiments described and other embodiments will be clearly apparent to the person skilled in the art.

For example, it is possible to place a temperature sensor in the interior wall of the outer lens 13 of the lighting and signalling system 2. In this way it is possible to dispense with the value of the outside temperature, as only the temperature of the wall and the dew point temperature of the mass of air inside the lighting and signalling system 2 are relevant for determining when and at what power level the heating means 7 must be activated.

Similarly, it is possible to determine the inside and outside temperature values by estimation methods rather than by direct measurement. It is then possible to dispense with temperature sensors.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A device for controlling a vehicle light having a light source and an outer lens that separates an internal space of the vehicle light from an outside of a vehicle, the device comprising a controller adapted to determine a dew point temperature value inside said internal space of the vehicle light from at least one value of a temperature inside said internal space of the vehicle light and at least one value of a relative humidity inside said internal space of the vehicle light.

2. The device according to claim 1, further comprising a sensor of said temperature inside said internal space of the vehicle light.

3. The device according to claim 1, further comprising a sensor adapted to measure a value of relative humidity inside said internal space of the vehicle light.

4. The device according to claim 1, further comprising a sensor of a temperature outside said vehicle light.

5. The device according to claim 1, wherein said controller is adapted to control at least one heater of said vehicle light as a function of said dew point temperature value and at least one other temperature value.

6. The device according to claim 5, wherein said at least one other temperature value is a value of a temperature outside said vehicle.

7. The device according to claim 6, wherein said controller is adapted to maintain said at least one heater of said vehicle light active for a predetermined time period (Y) once the value of said outside temperature has risen above said dew point temperature value.

8. The device according to claim 1, wherein said controller is adapted to determine at a given time a value of a derivative of a function representing an evolution of a dew point temperature value at said given time.

9. The device according to claim 1, wherein said controller is adapted to determine a value representing a time at which said dew point temperature value will be equal to an outside temperature value and to control at least one heater with a time advance of a predetermined duration (X) relative to said time.

10. The device according to claim 1, wherein said dew point temperature value represents a current dew point temperature.

11. The device according to claim 10, wherein said controller is adapted to control at least one heater when said dew point temperature value is greater than an outside temperature value.

12. The device according to claim 1, wherein said controller is further adapted to control at least one heater of said vehicle light so as to prevent icing up inside said vehicle light.

13. The device according to claim 12, wherein said controller is adapted to determine a power value of said at least one heater from at least two non-zero values as a function of a value of a temperature outside said vehicle.

14. A vehicle lighting and signalling system wherein said vehicle lighting and signalling system includes at least one device according to claim 1.

15. A method of controlling a vehicle light having an outer lens that separates an internal space of the vehicle light from an outside of a vehicle, the method comprising determining a dew point temperature value inside said internal space of the vehicle light from at least one value of a temperature inside said internal space of the vehicle light and at least one value of a relative humidity inside said internal space of the vehicle light.

16. A device for controlling a vehicle light having an outer lens that separates an internal space of the vehicle light from an outside of a vehicle, the device comprising a sensor adapted to determine a dew point temperature value inside said internal space of the vehicle light from at least one value of a temperature inside said internal space of the vehicle light and at least one value of a relative humidity inside said internal space of the vehicle light.

17. The device according to claim 16, wherein said sensor is adapted to measure a value of said temperature inside said internal space of the vehicle light.

18. The device according to claim 16, wherein said sensor is adapted to measure a value of said relative humidity inside said internal space.

19. The device according to claim 16, wherein said sensor is adapted to measure a temperature outside said vehicle light.

20. The device according to claim 16, wherein said sensor comprising a controller that is adapted to control at least one heater of said vehicle light as a function of said dew point temperature value and at least one other temperature value.

21. The device according to claim 20, wherein said at least one other temperature value is a value of a temperature outside said vehicle.

* * * * *